United States Patent [19]

Barclay

[11] Patent Number: 4,805,334
[45] Date of Patent: * Feb. 21, 1989

[54] FISHNET HANGING SYSTEM

[76] Inventor: Robert W. Barclay, 4710 University Way NE.; #712, Seattle, Wash. 98105

[ * ] Notice: The portion of the term of this patent subsequent to Aug. 16, 2005 has been disclaimed.

[21] Appl. No.: 8,221

[22] Filed: Jan. 27, 1987

Related U.S. Application Data

[63] Continuation-in-part of Ser. No. 762,003, Aug. 2, 1985, Pat. No. 4,763,432.

[51] Int. Cl.4 .............................................. A01K 71/00
[52] U.S. Cl. ............................................... 43/7; 43/9; 43/14
[58] Field of Search ............................. 43/7, 9, 10, 14

[56] References Cited

U.S. PATENT DOCUMENTS

| | | | |
|---|---|---|---|
| 3,158,951 | 12/1964 | Lewis | 43/14 |
| 3,162,967 | 12/1964 | Luketa | 43/9 |
| 3,545,120 | 12/1970 | Takaoka | 43/44.9 |
| 3,851,979 | 12/1974 | Becker | 403/76 |
| 4,378,617 | 4/1983 | Burns | 24/336 |
| 4,510,650 | 4/1985 | Espinoza | 24/16 PB |
| 4,644,679 | 2/1987 | Ban | 43/14 |

FOREIGN PATENT DOCUMENTS

| | | | |
|---|---|---|---|
| 607692 | 11/1960 | Canada | 43/14 |
| 368676 | 1/1960 | Japan | 43/14 |

Primary Examiner—Kurt Rowan
Attorney, Agent, or Firm—Ward Brown; Robert W. Beach

[57] ABSTRACT

A hanging cord is threaded through the top selvage of the net or web of a fishnet assembly and is secured at regularly spaced locations to separate anchor blocks which, in turn, are secured to the fishnet corkline. The anchor blocks have rigid bodies and swingable connectors with arms projecting from the block bodies for attachment of the hanging cord to the connector arms, such as by clips clamping the hanging cord and having lines fitted through eyes in the arms. The securing of the anchor blocks to the corkline can be by straps or staples threaded through the block bodies and tightenable to clamp the blocks to the corkline. The bottom selvage of the net can be connected to the lead line in the same manner by threading a separate hanging cord through the bottom selvage and securing it at regularly spaced intervals to corresponding anchor blocks clamped to the lead line. The hanging cords can be replaced by providing each anchor block with at least one long closed loop to be threaded through the net and interwoven with the loops of the adjacent anchor blocks.

10 Claims, 9 Drawing Sheets

FISHNET HANGING SYSTEM

CROSS REFERENCE

This application is a continuation-in-part of my co-pending U.S. patent application Ser. No. 762,003, filed Aug. 2, 1985, now U.S. Pat. No. 4,763,432.

TECHNICAL FIELD

The present invention relates to anchor mechanism for attachment to a cylindrical length, and particularly to mechanism for coupling the top and bottom selvages of a fishnet to a corkline and a lead line, respectively.

BACKGROUND ART

Known gill nets have a top corkline consisting of a rope carrying spaced floats, a bottom lead line, usually a rope with internal weights, and a central net or web. The top and bottom selvages of the web can be connected, respectively, to the corkline and lead line by separate hanging cords. To prevent bunching of the net, the hanging cords must be securely knotted to the corkline and lead line at substantially uniformly spaced locations.

The completed setup or shackel of gill net can be large. For example, for salmon fishing in the Bristol Bay area of Alaska the completed shackel can be 50 fathoms (76.2 meters) long and 5 to 10 fathoms (7.6 to 15.2 meters) deep. The web itself can be rolled or folded to compact condition, but the lead line and particularly the corkline are bulky.

The mesh size of the web desired depends on the size and species of the fish to be caught. Again using the example of salmon fishing in Bristol Bay, different webs may be desired for reds (sockeye), pinks (chum), silvers (Coho) and kings (Chinook). Changing webs on short notice, such as before the next tide change, may result in a greatly increased catch.

Government regulations and storage space may limit the number of complete shackels available on board, and fishing may be conducted in an area remote from shore storage or even from a tender where additional shackels might be kept. There also is substantial additional expense in acquiring, maintaining and storing additional shackels for the purpose of having webs of different mesh size conveniently available, as compared to hanging different webs from the same corkline and lead line.

For known hanging systems, it is a complicated and time-consuming process to uncouple a web from its corkline and lead line and rehang a new web. In addition, damage can occur to the corkline, web or lead line even when such process is performed by an experienced worker. Further, the time lost in changing webs can be extremely frustrating to a fisherman, particularly considering the shorter fishing seasons that can be imposed by the government.

DISCLOSURE OF THE INVENTION

The system in accordance with the present invention utilizes separate anchor blocks substantially permanently and immovably attachable to a cylindrical length or line, such as an otherwise conventional corkline or lead line, at uniformly spaced locations. Separate hanging cords can be quickly and easily attached to the anchor blocks, such hanging cords being threaded through loops of the top and bottom selvages of a net or web. The attaching mechanism can include connectors carried by the anchor blocks and plastic clips for clamping the hanging cord at desired locations and securable to the connectors. The attachment of the connectors to the anchor blocks can allow universal swiveling movement of the connectors and clips relative to the blocks. In a second embodiment, the hanging cords themselves can be threaded through eyes of the connectors and separate clips are provided to clamp each loop of hanging cord at opposite sides of the connector. In either embodiment, preferably sliding movement of the hanging cord relative to the individual anchor blocks is prevented by the clips.

In another embodiment, the separate hanging cords can be replaced by loops or lines that are fixed to and extend between the anchor blocks and are threaded through the adjacent selvage of the net or web. In one such form, each anchor block has two closed loops interwoven with the loops of the adjacent anchor blocks. In another form, one end of a single line is connected to one anchor block and, after the line is threaded through the adjacent net selvage, the other end is secured to the next anchor block. Such next anchor block also receives an end of another single line extending to the next anchor block, and so on.

The system is used for quickly and reliably coupling a fishnet or web to the corkline or lead line, using simple and inexpensive but durable components, and is usable by unskilled workers while still resulting in a uniform and reliable hanging of the web. The system also allows the web to be uncoupled from the corkline and lead line quickly and easily but does not result in damage to the reusable components of the fishnet setup or shackel when the web is uncoupled. The system is adaptable for fishing in heavy seas and for compact storage without tangling.

BEST MODE FOR CARRYING OUT THE INVENTION

Figure 1:
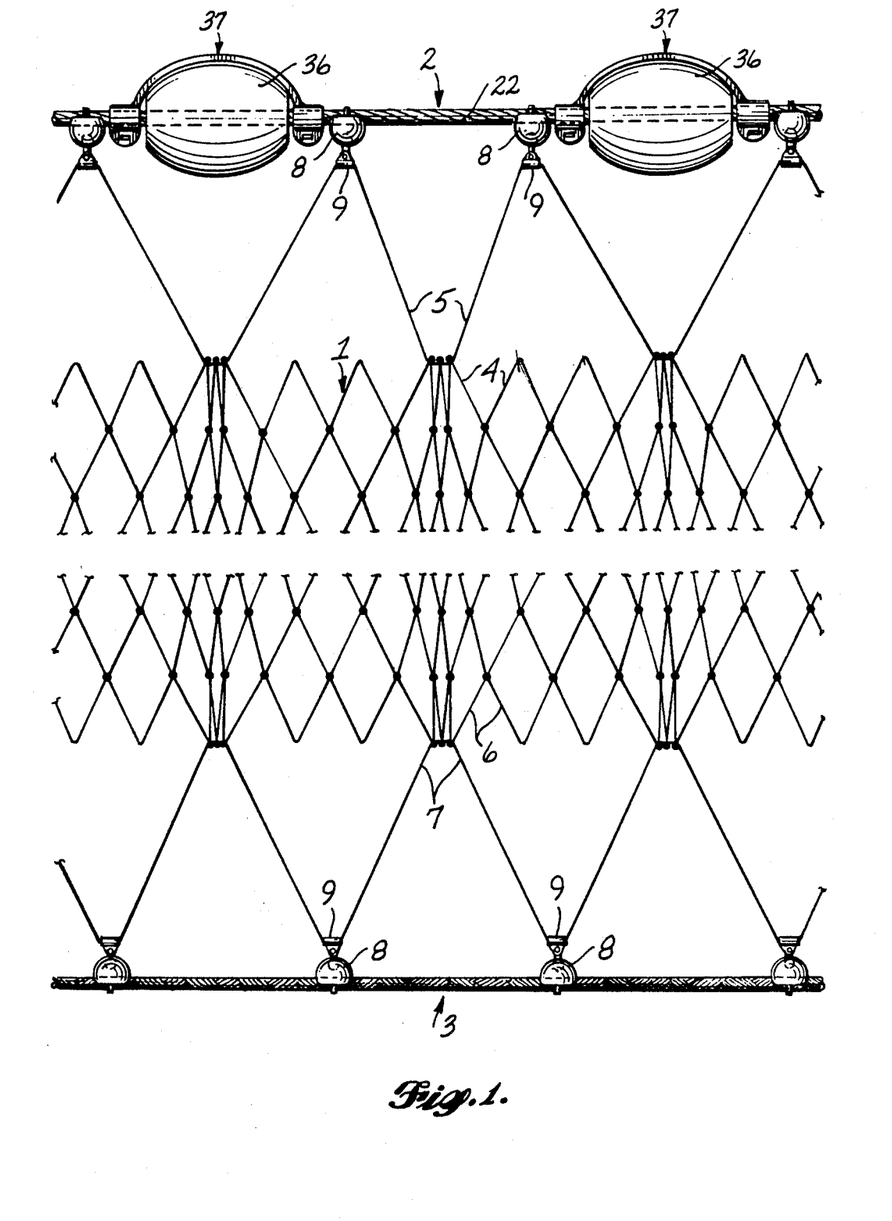
FIG. 1 is a fragmentary, somewhat diagrammatic, side elevation of a shackel of fishing gear utilizing a fishnet hanging system in accordance with the present invention.

As shown in FIG. 1, the fishnet hanging system in accordance with the present invention is preferably used to couple a conventional net or web 1 to cylindrical lengths or lines, namely, a conventional top corkline 2 and a conventional bottom lead line 3. In general, the top selvage 4 of web 1 is coupled to the corkline by a separate hanging cord 5 which is threaded through selected loops of such selvage and firmly connected to the corkline at uniformly spaced locations, and the bottom selvage 6 of the web is coupled to the lead line by a separate hanging cord 7 threaded through selected loops of selvage 6 and firmly connected to the lead line at uniformly spaced locations.

As thus far described, the hanging system is conventional. In the past, the appropriate hanging cord would be threaded through the selected loop or loops of selvage and be securely knotted to the corkline or lead line, then threaded through the next selected loop or loops of selvage, and so on—a time-consuming process requiring experience to assure a reliable coupling of the web to the corkline and lead line. To remove the web, it was necessary to cut each individual knot of hanging cord at the corkline or lead line which, even if conducted carefully, could result in advertently cutting or at least nicking the corkline or lead line.

To simplify and speed up the procedure of coupling the web to the corkline and lead line, the present invention uses separate anchor blocks 8 which can be quickly and easily secured to the corkline and lead line at the desired uniformly spaced locations and which, once secured, are intended to be permanent additions to their lines. Disposable clips 9 are coupled to the anchor blocks 8 and clamp the hanging cords between adjacent loops through which the hanging cords are threaded.

The construction of the anchor blocks 8 is best seen in FIGS. 2 through 5. Each block is a generally spherical body having a central, upright, through bore 10 and an arcuate, preferably semicylindrical, horizontally extending notch or cutout 11 in its top. A connector ball 12 of a diameter only slightly less than the diameter of the anchor block bore 10 is fitted downward into the bore and seats against an annular lip 13 projecting inward from the bottom margin of the bore. Ball 12 has a downwardprojecting arm 14 with an eye 15 located below the anchor block when the ball is inserted.

Figures 2, 3, 4, 5:
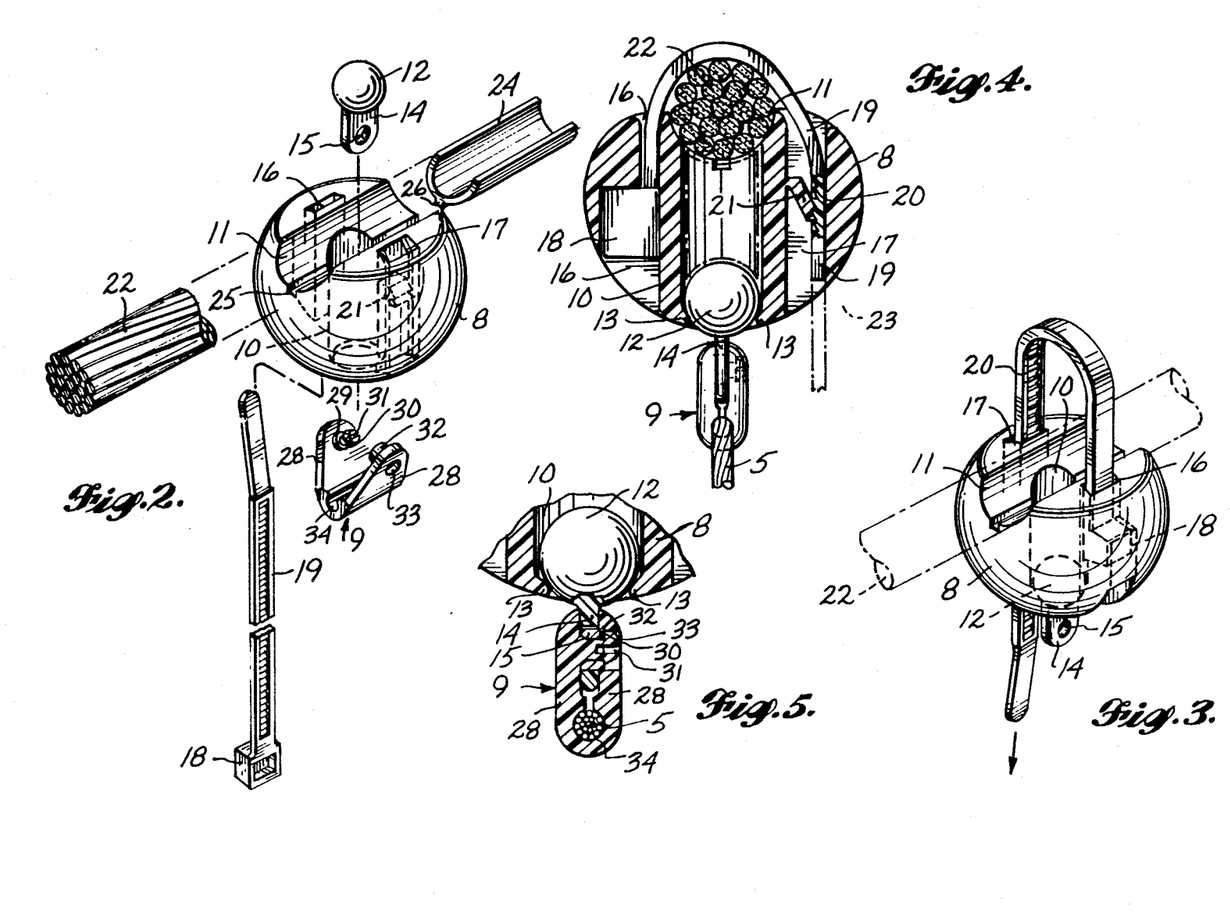
FIG. 2 is a top perspective of components of the system of FIG. 1 with parts shown in exploded relationship.
FIG. 3 is a corresponding top perspective with such parts partially assembled.
FIG. 4 is a somewhat diagrammatic, vertical, transverse section along line 4—4 of FIG. 3 with the parts completely assembled.
FIG. 5 is a vertical transverse section corresponding to FIG. 4 but on a larger scale with parts broken away.

As best seen in FIG. 4, the anchor block 8 also has upright through slots 16 and 17 at opposite sides of its central bore 10 and the arcuate concave cutout 11. The bottom end portion of the slot 16 at one side is larger than its top portion for receiving the enlarged head 18 of a conventional plastic cable tie having a long flexible tail 19 with ratchet teeth 20 on one of its flat surfaces. The slot 17 at the other side is of substantially uniform cross section, but a ratchet finger or pawl 21 integral with the remainder of the anchor block projects downward and outward from the inner wall of slot 17.

As also best seen in FIG. 4, preferably the radius of curvature of the concave cutout 11 is approximately the same as the radius of the corkline rope 22 so that the rope can be fitted snugly into such cutout. To secure the anchor block to the rope, the cable tie tail 19 is threaded upward through slot 16 and is wrapped over the top of the corkline rope, and then is inserted downward through slot 17 as illustrated in FIG. 3. The free end portion of the tail is pulled tight and its inner ratchet teeth 20 slide successively past the inner ratchet arm or pawl 21 which has complemental teeth at its outer end. As diagrammatically indicated in FIG. 4, with such tail 19 under substantial tension, the tail is cut close to the bottom periphery of the anchor block 8, such as at the location of the broken line 23. Because the lines and/or the plastic cable ties are somewhat resilient, the cut end of the tail snaps back into the slot 17. The upper portion of the tail 19 looped over the float line rope 22, however, is retained under tension by the inner locking of pawl 21 with the tie ratchet teeth 20 so that the anchor block is immovable relative to the float line rope 22.

As indicated in FIG. 2, to accommodate a rope of lesser diameter, a semicylindrical insert 24 can be fitted into the arcuate anchor block cutout 11. Preferably such cutout has a bottom groove 25 to receive a downward-extending projection or key 26 of the insert 24. In some applications, the corkline rope is of larger diameter than the lead line rope, so that anchor blocks without the inserts 24 would be used for securing the blocks to the corkline rope but blocks with the inserts 24 would be used for the lead line.

As shown in FIG. 1, preferably the anchor blocks 8 are secured to the corkline 2 and lead line 3 as described above at substantially uniformly spaced locations, such as every 7 or 8 inches (17.78 cm or 20.32 cm), and the hanging cords 5 and 7 passing through the selected loops of web selvages 4 and 6 are coupled to the connector balls carried in the blocks by plastic clips 9 shown in greater detail in FIGS. 2, 4 and 5. Each clip is of generally U shape with upward-projecting wings 28. One of such wings has an inward-projecting pin 29 with an enlarged head 30 split by a transverse slot 31 in its end. The other wing has an annular inward-projecting boss 32 with a central through bore opening into a larger cylindrical recess 33 in the outer side of such wing. The return bent base section of the clip is shaped to form a generally cylindrical passage 34 between the wings.

As seen in FIG. 5 with the appropriate hanging cord, line 5 as shown in FIG. 5, fitted in the base passage 34 of a clip 9, the clip can be arranged with the boss 32 received in the eye 15 of the ball arm 14 projecting from one of the anchor blocks 8. The clip wings 28 are forced together so that the split head 30 of the inward-projecting pin 29 is forced through the boss. Preferably the end of the head is flared and its opposite sides are squeezed together as they pass through the boss. When the head passes beyond the bore of the boss into the clip recess 33, the opposite sides of the head spring outward to lock the clip to the ball arm 14. With the clip wings held together the diameter of the passage 34 is less than the usual outer diameter of the hanging cord so that the hanging cord is clamped securely and cannot slide relative to the clip. In addition, the inner sides of the clip passage 34 can be formed with ribs or teeth that embed in the hanging cord to further assure that it will not slide relative to the clip.

Because of the connection of the clips 9 to the arms 14 of balls 12, the clips can swivel universally relative to the anchor blocks 8 which, themselves, are substantially rigidly secured to the corkline and lead line ropes. Movement of the balls longitudinally of the anchor block bores 10 is limited by engagement of the upward-projecting clip wings 28 with the bottom margins of the bores. Nevertheless, attachment of the clips to the ball arms 14 may be somewhat easier if longitudinal movement of the balls in their bores is even more limited which can be accomplished by use of a cylindrical insert 35 that is fitted into the block bore 10 over the top of the ball 12 prior to securing the anchor block to its corkline or lead line, as shown in broken lines in FIG. 4.

It is important that there be no sharp corners or projections on the hanging system components on which the web could catch or become tangled when the completed shackel is rolled onto a drum or folded for storage or when the web is thrown onto the corkline in heavy seas. All exposed surfaces of clip 9 are rounded; the end of the clip pinhead is at most flush with the outer side of the clip; the periphery of each anchor block is substantially spherical; the enlarged cable tie head 18 is recessed into its anchor block so that its outer end is no more than flush with the periphery of the block; the cable tie tail is thin and tightly wrapped over the top of its line (in fact slightly indented into the line); and the free end of the cable tie tail 19 is cut while under tension so that the cut end is at most flush with the periphery of the anchor block; so that the possibility of the web becoming tangled with the hanging system components is eliminated or at least greatly reduced.

For the form shown in FIGS. 1 through 5, when it is desired to uncouple the web from the corkline and/or lead line, the clips 9 can be quickly cut or crushed by use of nippers. Alternatively, a hand punch can be used to punch a hole through each clip in registration with its pin 29 and thereby allow the clip to be separated from its block. New clips and, usually, a new hanging cord are used when recoupling the web to the same or a new corkline or lead line.

With reference to FIG. 1, usually the corkline floats 36 are slidable along the corkline rope 22. For use with the hanging system in accordance with the present invention, it is preferred that such floats be retained against longitudinal movement so as to prevent the floats from striking the anchor blocks and damaging or moving them. Consequently, it is preferred that a float retainer 37 of the construction shown in detail in FIGS. 6 through 10 be provided to retain the floats in position.

Figure 6:
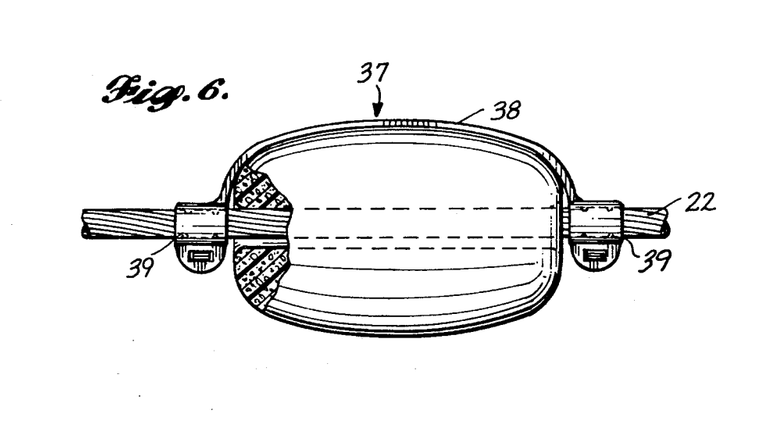
FIG. 6 is a side elevation of another component, namely, a float retainer, of the fishnet hanging system of FIG. 1 with parts broken away.
Figure 7:
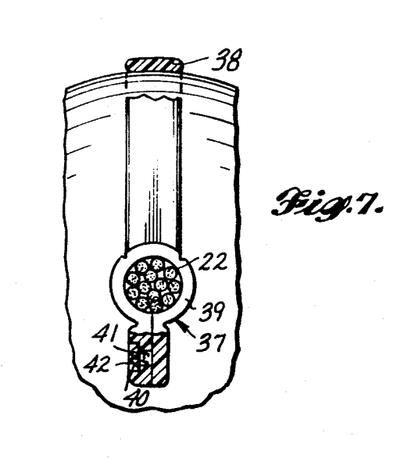
FIG. 7 is an enlarged, fragmentary, end elevation of the float retainer of FIG. 6 with parts broken away.
Figure 8:
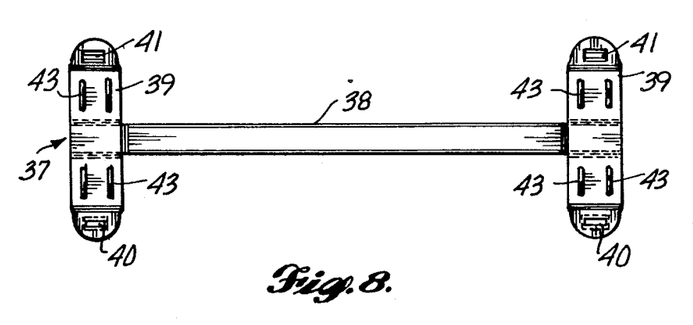
FIG. 8 is a bottom plan of the retainer of FIG. 6.
Figure 9:
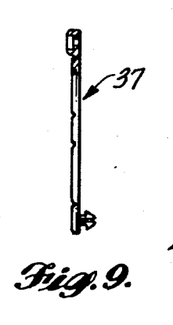
FIG. 9 is an end elevation of the retainer of FIG. 6.
Figure 10:
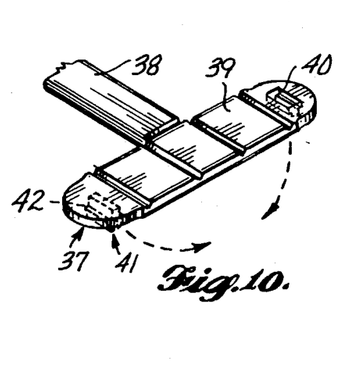
FIG. 10 is a fragmentary, somewhat diagrammatic, top perspective of the retainer of FIG. 6.

The retainer 37 shown in FIGS. 6 through 10 is of one-piece plastic construction with a thin, narrow, central portion or tie 38 of a length sufficient to be looped over the top of a float as shown in FIG. 6. The opposite ends 39 of the retainer are in the form of flexible clamps elongated transversely of the length of the tie 38. One end portion of each clamp has a through bore 40 including an enlarged outer section, as best seen in FIG. 7. The other end portion of each clamp has a pin 41 which, similar to construction of the clip pin 29 previously described, has an enlarged head 42 split by a transverse slot in its outer end. As diagrammatically represented in FIG. 10 and as shown in FIG. 7, the clamp ends can be bent around the corkline rope to force the enlarged pinhead through the bore 40 and clamp the corkline rope 22. As seen in FIG. 8, the portions of the retainer ends or clamps 39 engaged against the corkline rope can have ribs or teeth 43 to be embedded in the periphery of the rope and thereby assure that the clamp ends cannot be slid longitudinally of the rope.

Figure 11:
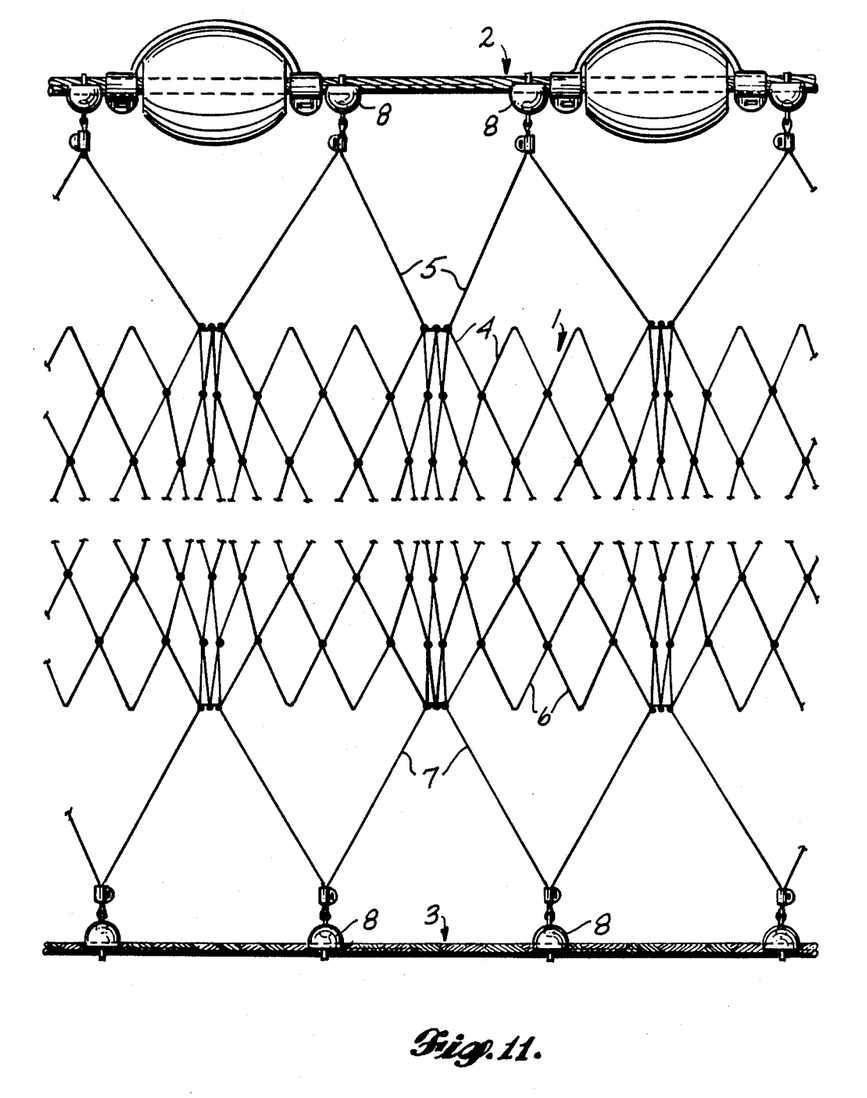
FIG. 11 is a fragmentary, somewhat diagrammatic, side elevation of a shackel of fishing gear utilizing an alternative fishnet hanging system in accordance with the present invention, similar to the system of FIG. 1 except for an alternative component, namely, an alternative hanging cord clip.
Figure 12:
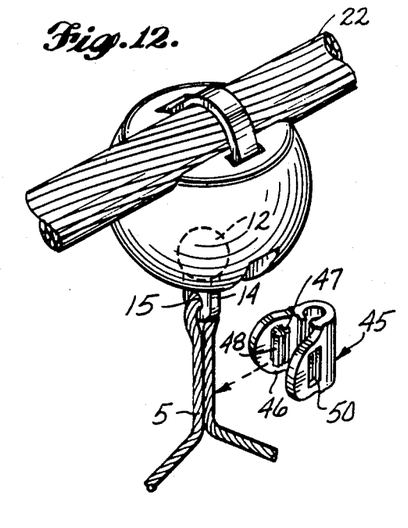
FIG. 12 is an enlarged top perspective of the alternative hanging cord clip of FIG. 11 illustrating its connection to a hanging cord.
Figure 13:
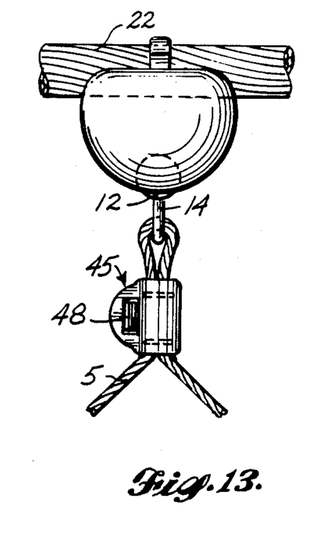
FIG. 13 is a side elevation of such clip after attachment to a hanging cord.
Figure 14:
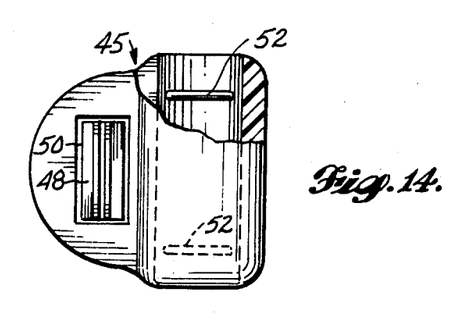
FIG. 14 is an enlarged side elevation of the clip of FIGS. 11, 12 and 13, with parts broken away.
Figure 15:
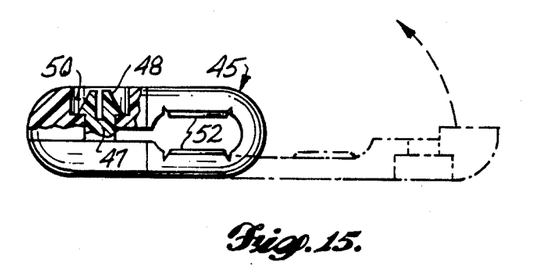
FIG. 15 is a somewhat diagrammatic end elevation of such clip with parts broken away.

The embodiment of fishnet hanging system shown in FIG. 11 uses anchor blocks 8 secured to the corkline 2 and lead line 3 and identical to the anchor blocks previously described. The hanging cords 5 and 7 are threaded through selected loops of the top and bottom selvages 4 and 6 of the web 1 in the same manner as for the previously described embodiment. As best seen in FIGS. 12 through 15, however, rather than securing the hanging cords to clips which, in turn, are secured to the connectors in the anchor blocks, each hanging cord, such as line 5, is threaded through the eye 15 of arm 14 projecting downward from the internal anchor block ball 12. A separate clip 45 is used to clamp the resulting loop of hanging cord directly below the ball arm 14. The construction of such clip 45 is very similar to the construction of clip 9 previously described in that clip 45 is of generally U shape with outward-projecting wings 46. One of such wings has the inward-projecting pin 47 with an enlarged head 48 split by a transverse slot permitting the opposite sides of the head to be squeezed together. The other clip wing has a through bore 50 for receiving the pinhead 48. The base of the clip forms an internal passage for receiving the stretches or loop of hanging cord, with inward-projecting ribs or teeth 52 that are embedded in the hanging cord when it is clamped in the clip passage to assure that the hanging cord cannot slide relative to the clip. After assembly, the web can be uncoupled from the corkline or lead line by simply cutting the hanging cord.

Figures 16, 17:
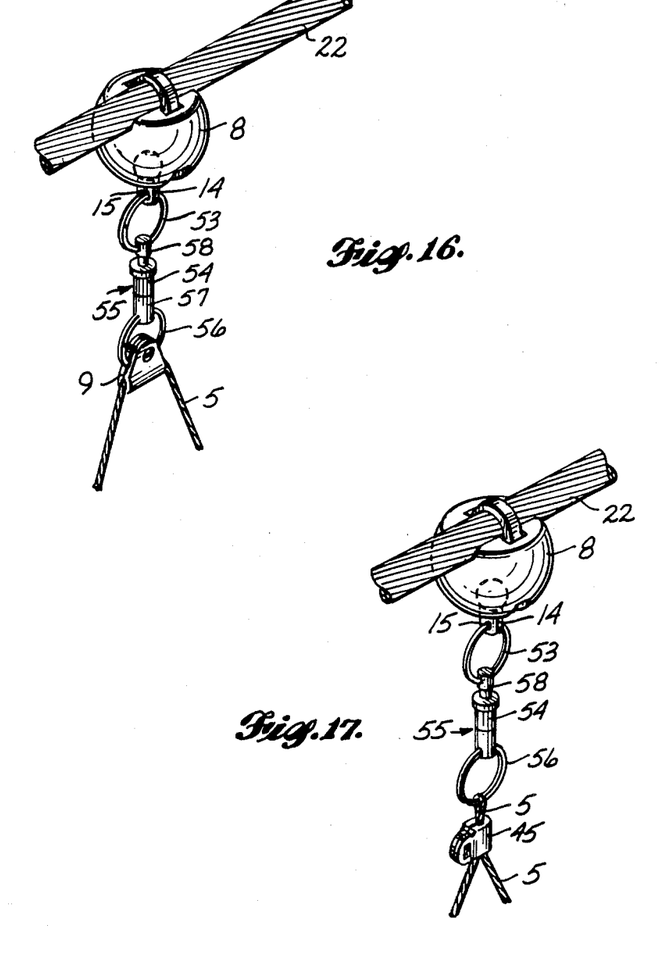
FIG. 16 is a somewhat diagrammatic, fragmentary, top perspective of another modified fishnet hanging system in accordance with the present invention.
FIG. 17 is a somewhat diagrammatic, fragmentary, top perspective of yet another modified form of a fishnet hanging system in accordance with the present invention.

In the embodiment shown in FIG. 16, anchor blocks 8 identical to the anchor blocks previously described are secured to the corkline and the lead line, only the corkline rope 22 being shown. An upper split ring 53 connects the eye 15 of the ball arm 14 lower coupling sections are normally firmly coupled together but which can be separated by pressing the upper plunger 58. Consequently, the web hung by line 5 can be uncoupled from the corkline quickly and a new web to which the hanging cord clips 9, lower split rings 57 and lower coupling sections 56 already have been attached can be connected to the upper coupling sections 54 which remain attached to the anchor blocks 8.

The general system shown in FIG. 16 also can be used with the second form of clips 45 instead of the first form of clips 9. As shown in FIG. 17, the appropriate hanging cord, such as line 5, can be threaded through the lower split ring 56 with a clip 45 clamping the loop of hanging cord at opposite sides of such ring.

Figure 18:
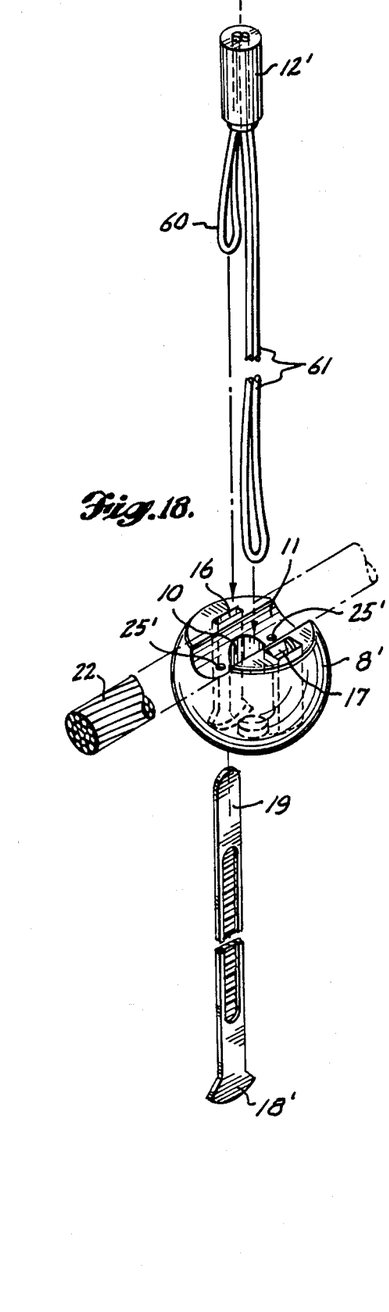
FIG. 18 is a somewhat diagrammatic, fragmentary, top perspective of still another modified fishnet hanging system in accordance with the present invention, including an anchor block, a strap for connecting the anchor block to a line and a plug or swivel connector unit with loops for replacing the separate hanging cord used in other embodiments of the invention.
Figure 19:
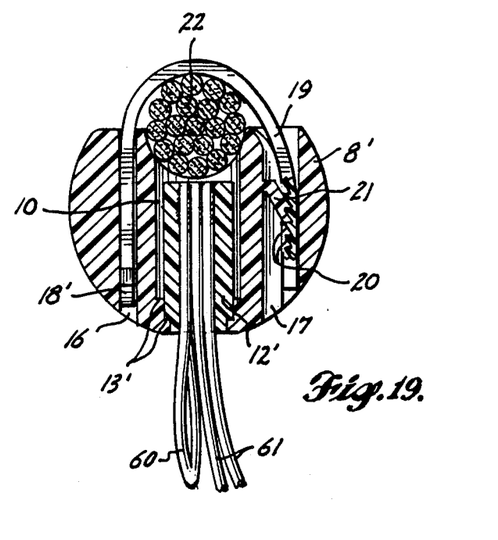
FIG. 19 is a central vertical section through the anchor block and plug or swivel connector unit of the embodiment shown in FIG. 18.

In the embodiment of the present invention shown in FIGS. 18 and 19, each anchor block 8' is almost identical to the anchor blocks 8 previously described. Each block 8' still has the arcuate cutout 11 for receiving the line, such as line 22. Rather than providing grooves for an insert, there are small circular depressions 25' in such cutout 11. The upright central bore 10 is positioned between the two slots 16 and 17. Slot 16 receives the tail 19 of the flexible strap which has an enlarged head 18' for receipt in the enlarged bottom portion of slot 16. As best seen in FIG. 19, the other slot, slot 17, has the inner ratchet arm or pawl 21 which engages the ratchet teeth 20 of the strap tail 19. The strap is tightened by pulling the tail through slot 17, thereby clamping the anchor block 8' to the line.

Figure 20:
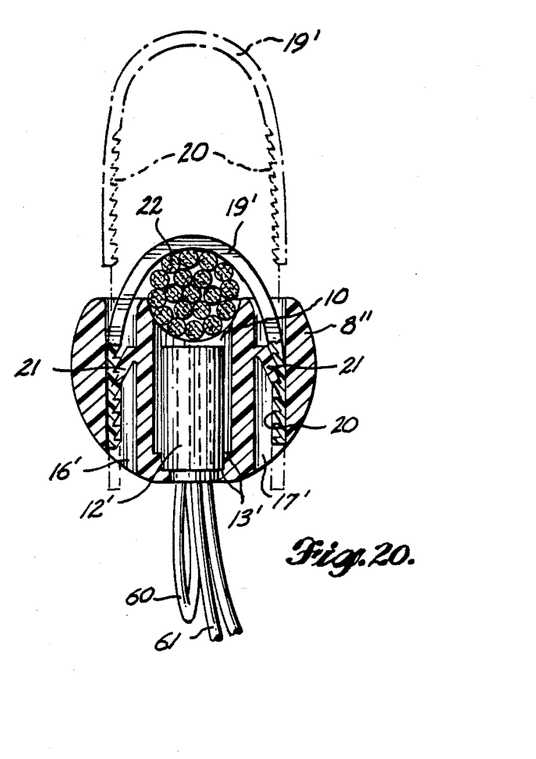
FIG. 20 is a corresponding vertical section illustrating a slightly modified anchor block and strap or staple connection.

Alternatively, as indicated in FIG. 20, a modified anchor block 8" can have a ratchet arm or pawl 21 in each of the slots 16' and 17' opposite its central bore 10, and the strap can be a flexible or semirigid or rigid U-shaped tie or staple 19' with ratchet teeth 20 along the inner sides of its opposite upright legs. The tie or staple 19' can be forced downward to clamp the anchor block 8" to its line 22. The embodiment of FIG. 20 may be better adapted to attachment of the anchor blocks to a cylindrical length or line by use of automatic machinery.

The "connector" 12' used with the embodiments shown in FIGS. 18 through 20 is cylindrical and is fitted in the central upright bore 10 of its anchor block 8' or 8" as best seen in FIG. 19 or FIG. 20. The bottom end portion of such connector is stepped to match the stepped bottom end portion of the anchor block bore which forms the short shoulders 13'. The connector 12' can rotate freely in the anchor block bore.

Figures 21, 23:
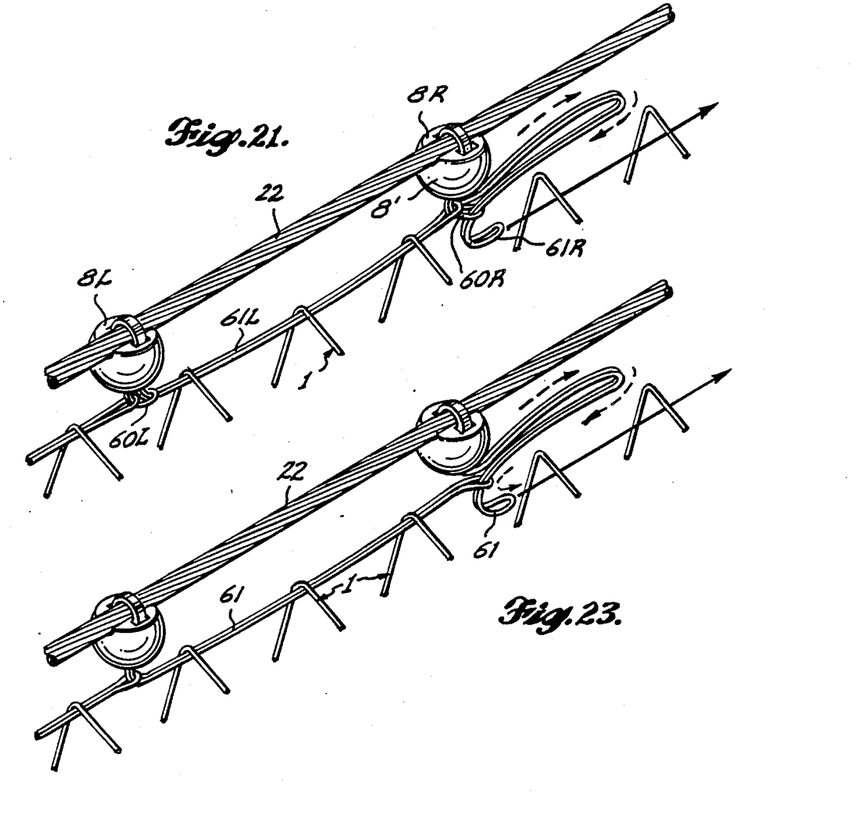
FIG. 21 is a fragmentary top perspective illustrating attachment of a net to a line by use of components in accordance with FIGS. 18 and 19.
FIG. 23 is a fragmentary top perspective illustrating an alternative manner of attachment of a net to a line by use of further modified components in accordance with the present invention.
Figure 22:
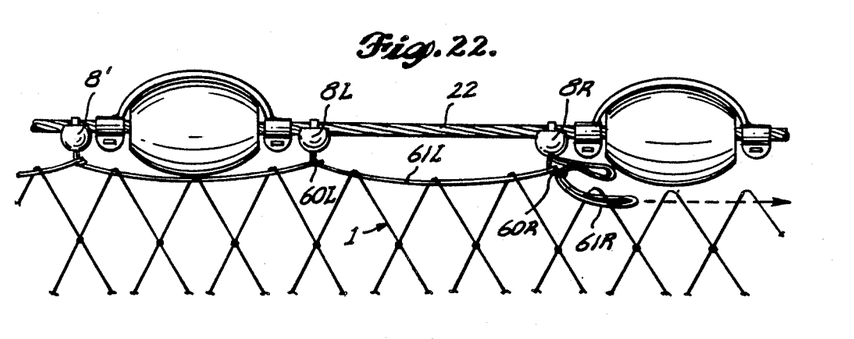
FIG. 22 is a fragmentary side elevation illustrating the same attaching method.

The cylindrical connector 12' has its own central bore receiving the ends of two loops 60 and 61 of flexible cord or line such as heavy monofilament fishing line. The ends of each of the closed loops can be glued in the connector bore or sonically welded or otherwise fused or securely attached. As best seen in FIG. 18, one of the loops, loop 60, is substantially shorter than the other loop, loop 61. As seen in FIGS. 21 and 22, the loops 60 and 61 extending from the anchor block connectors can be used for securing the net or web 1 to the line 22 carrying the anchor blocks, thereby eliminating the need for a separate hanging cord. In FIG. 21 the anchor block shown at the left is numbered 8L and its loops 60L and 61L, and the block shown at the right is numbered 8R and its loops 60R and 61R. The corresponding blocks and their loops are correspondingly numbered in the side elevation of FIG. 22. The long loop 61L from block 8L is threaded through the selvage of net 1. Then the shorter loop 60R of block 8R is threaded through the closed end of the longer loop 61L from the preceding block 8L. Next, the longer loop 61R is inserted through the closed end of the short adjacent loop 60R. Finally the longer loop 61R is threaded through the next loops of selvage to the next anchor block and the procedure is continued so that the long and short loops are interwoven for connecting the net to the line.

An advantage of the weaving procedure illustrated in FIGS. 21 and 22 is that no more than a few loops 60 and 61 will unravel if any loop is severed. In some applications, however, it may be desirable to speed up disconnection of the line 22 from the net 1, in which case the embodiment shown in FIG. 23 can be used. In that embodiment the short loops have been deleted and each long loop 61 is inserted through the closed end of the preceding loop. Cutting the last loop will quickly unravel the chain to free the net 1 from line 22.

Figure 24:
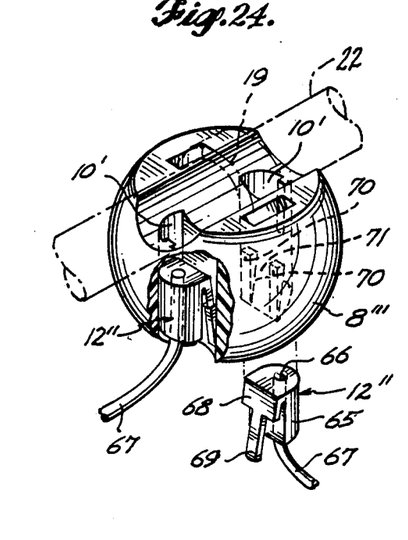
FIG. 24 is a somewhat diagrammatic, fragmentary, top perspective of yet another modified fishnet hanging system in accordance with the present invention.
Figure 25:
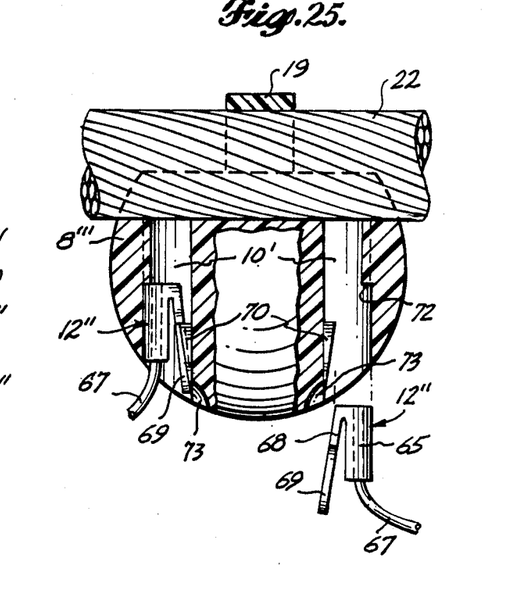
FIG. 25 is a somewhat diagrammatic, fragmentary, vertical section of components of the system illustrated in FIG. 24.
Figure 26:
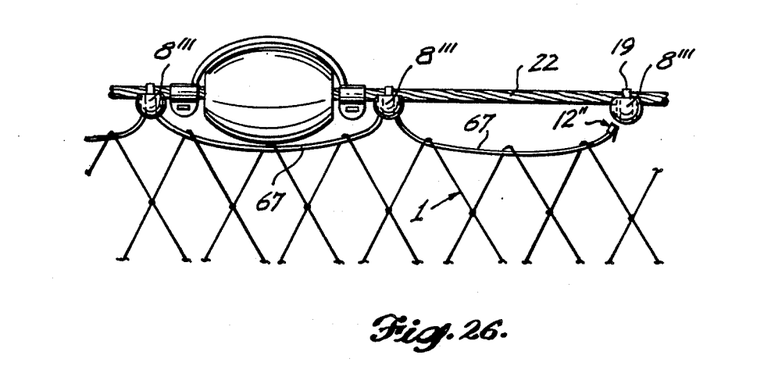
FIG. 26 is a diagrammatic side elevation illustrating attachment of a net to a line by use of components in accordance with FIGS. 24 and 25.

Still another embodiment of the present invention is illustrated in FIGS. 24 through 26 where a modified form of anchor block 8'" is used. Such block can be connected to a line 22 by a tie or strap 19 as in the preceding embodiment. Rather than providing a single, central, upright bore, however, block 8'" has two side-by-side upright bores 10' each for receiving a plug type connector 12". As best seen in FIG. 24, the bores and connectors are of generally complemental cross section, namely, substantially semicircular. Each plug has a body portion 65 with a bore 66 for receiving an end of a flexible cord or line 67. A bendable tab 68 is inclined downward and outward from its body 65 and has a narrow tail 69. As a plug connector 12" is inserted into its bore 10', the bendable tab 68 is forced inward by inward-projecting, transversely spaced ramps or wedges 70 extending inward from the inner side of the bore 10'. When the plug connector 12" has been sufficiently inserted, the tab 68 springs outward with its tail 69 received in the space 71 between the wedges 70. Further inward movement of the plug connector 12" is prevented by a shoulder 72 formed in the bore 10' as best seen toward the right of FIG. 25. In its fully inserted position, the tail 69 of a plug connector 12" is recessed slightly inward into its slot 10'. Preferably there is a small arcuate notch 73 adjacent to the inner side of each slot for fingertip access to the tab tail 69, allowing it to be pinched inward so as to permit removal of the plug connector 12". As seen in FIG. 26, the plug connectors can be secured to the opposite ends of short lines 67 which can be threaded through the selvage of the net and connected to adjacent anchor blocks 8'" for connecting the net to a line such as line 22.

I claim:

1. In mechanism for coupling a net to an elongated cylindrical length, the improvement comprising several anchor blocks of rigid material each having two bores opening at the exterior thereof, means for clamping said blocks to the cylindrical length at fixed locations spaced lengthwise of the cylindrical length, and several lengths of hanging line, each of said lengths of hanging line having a plug connector at each end, said plug connectors being fittable in said anchor block bores for connecting opposite ends of a hanging line to adjacent anchor blocks after threading of the hanging line through the net.

2. In the mechanism defined in claim 1, the plugs being securely fastened to the anchor blocks by insertion into the bores such that the plugs cannot be removed by simply pulling on the associated hanging line.

3. In the mechanism defined in claim 2, the plug connectors being removable from the anchor blocks by manual manipulation without structural damage to the plug connectors.

4. Mechanism for coupling a net to a cylindrical length, such net being carried by a hanging cord, comprising several anchor blocks of rigid material, means for clamping said blocks to the cylindrical length at fixed locations spaced lengthwise of the cylindrical length, and connection means for connecting each anchor block to the hanging cord, said connection means including several identical first connection components, one for each of said blocks, carried by said blocks, respectively, and several identical second connection components, one for each of said first connection components, carried by the hanging cord at fixed locations spaced lengthwise of such cord, said first and second connection components having cooperable, complemental, manually connectible and disconnectible, rigid, quick-coupling parts for manual connection and disconnection of said first and second connection components to connect and disconnect the anchor blocks and the hanging cord without structural damage to said connection components and without tying or untying or cutting the hanging cord.

5. In mechanism for coupling a net to a cylindrical length, the improvement comprising several anchor blocks of rigid material, means for clamping said blocks to the cylindrical lengths at fixed locations spaced lengthwise of the cylindrical length, several separate lengths of hanging line each having a connector at each end, said connectors being connectible to separate anchor blocks, respectively after threading of their length of hanging line through the net for connecting the net of the anchor blocks.

6. The method of coupling a net to a cylindrical length which comprises clamping to the cylindrical length a multiplicity of separate rigid anchor blocks in substantially fixed position and spaced lengthwise of the cylindrical length, each of such blocks having a separate connector including a rigid arm portion projecting therefrom and swingable relative thereto, connecting a separate hanging cord to a selvage portion of the net, connecting spaced locations of the hanging cord to the projecting arm portions of the anchor block connectors such that there are two stretches of hanging cord extending in opposite directions from each connector, and clamping the oppositely extending hanging cord stretches together closely adjacent to each connector to limit movement of the hanging cord relative to the connectors.

7. The method defined in claim 6, including threading the hanging cord through eyes in the projecting arm portions of the connectors.

8. In mechanism for coupling a net to an elongated cylindrical length, the improvement comprising several anchor blocks of rigid material each having a bore opening at the exterior thereof, means for clamping said blocks to the cylindrical length at fixed locations spaced lengthwise of the cylindrical length, several separate connectors, one for each of said blocks, each of said connectors having a rigid portion fitted in the bore of its block and retained therein, said connectors having portions extending from their blocks for connection to the net to couple the net to said blocks, each block having a concave cutout opening at the exterior thereof for receiving the cylindrical length by movement of the cylindrical length transversely of its length into said cutout leaving a side of said cylindrical length exposed and through slots at opposite sides of said cutout, said clamping means including a generally U-shaped tie for each block having opposite legs inserted in said slots, respectively, so as to encircle the exposed side of the cylindrical length, each block having ratchet means permitting movement of the legs of its tie lengthwise through said slots in a direction to tighten the central portion of said tie around the cylindrical length and thereby clamp its block to the cylindrical length but preventing movement of the legs of said tie lengthwise in said slots in the opposite direction to loosen said tie.

9. In the mechanism defined in claim 8, the bore of each block having opposite end portions opening, respectively, at the exterior of the block and into the concave cutout.

10. In the mechanism defined in claim 9, the tie being in the form of a rigid U-shaped staple looped over the cylindrical length and having its opposite legs received, respectively, in the slots at opposite sides of the cutout.

* * * * *

UNITED STATES PATENT AND TRADEMARK OFFICE
CERTIFICATE OF CORRECTION

PATENT NO. : 4,805,334
DATED : February 21, 1989
INVENTOR(S) : Robert W. Barclay It is certified that error appears in the above-identified patent and that said Letters Patent is hereby corrected as shown below:

Claim 5: column 9, line 29, cancel "lengths" and insert ...length...; line 33, insert a comma after "respectively"; line 34, cancel "of" (second instance) and insert ...to...

Claim 6: column 9, line 39, cancel "position" and insert ...positions...

Signed and Sealed this

Twenty-ninth Day of August, 1989

Attest:

DONALD J. QUIGG

Attesting Officer

Commissioner of Patents and Trademarks